United States Patent [19]
van der Hoeven

[11] Patent Number: 4,789,604
[45] Date of Patent: Dec. 6, 1988

[54] DECORATIVE PANEL HAVING IMPROVED SURFACE PROPERTIES

[75] Inventor: Johannes C. W. van der Hoeven, Horn, Netherlands

[73] Assignee: Hoechst Aktiengesellschaft, Fed. Rep. of Germany

[21] Appl. No.: 909,551

[22] Filed: Sep. 22, 1986

[30] Foreign Application Priority Data

Sep. 21, 1985 [DE] Fed. Rep. of Germany ....... 3533737

[51] Int. Cl.[4] .............................................. B32B 27/08

[52] U.S. Cl. .................................... 428/503; 428/507; 428/511; 428/514; 428/913.3

[58] Field of Search ............... 428/503, 507, 511, 195, 428/211, 203, 204, 514, 913.3

[56] References Cited

U.S. PATENT DOCUMENTS 3,841,956 10/1974 Palazzolo et al. ................... 428/503
3,874,906 4/1975 Prucnal et al. ...................... 428/507
4,501,635 2/1985 Siry et al. ......................... 156/273.3
4,503,115 3/1985 Hemels et al. ...................... 428/281

*Primary Examiner*—Edith Buffalow
*Attorney, Agent, or Firm*—Foley & Lardner, Schwartz, Jeffery, Schwaab, Mack, Blumenthal & Evans

[57] ABSTRACT

A decorative panel and method therefor. The decorative panel includes a core layer and layers which are decorated on one or both sides of the core layer. At least the outermost layer of the panel on at least one of the two surfaces of the panel is predominantly composed of a synthetic resin which can be one or more components polymerized by radiation and includes unsaturated acrylates and methacrylates. This layer is scratch-resistant at a scratch loading of at least 1.5N, preferably 2-7N (DIN 53,799, part 10) and has a low gloss corresponding to a reflectometer value of not more than 50 at an angle of incidence of 85° (DIN 67,350).

18 Claims, 3 Drawing Sheets

DECORATIVE PANEL HAVING IMPROVED SURFACE PROPERTIES

BACKGROUND OF THE INVENTION

The invention relates to a decorative panel composed of a core layer and a layer decorated on one or both sides and to a process for its production. Panels of this type are employed for interior or exterior uses in the building industry, being used as cladding panels or self-supporting units, depending on their thickness.

The decorative panels used hitherto are, for example, high pressure decorative laminates (H.P.D.L.) (DIN 19,926), as they are called. They are composed of a stack of paper webs impregnated with resin and compressed under hot conditions, as the core layer, and of a top layer made of resin-impregnated decorative paper. These panels have the disadvantage that they are attacked by mineral acids, especially at concentrations above 10% and at an exposure time longer than 10 minutes. In addition, in the standard embodiment, these panels are not adequately resistant to weathering, since the type of resin used in the top layer is sensitive to hydrolysis. Panels of this type can, therefore, only be used to a limited extent as work benches in chemical laboratories or for the production of wet cells which have to be cleaned with acids. If they are used for exterior purposes, additional expensive measures are necessary to improve their resistance to the effects of weathering.

Laminates and panels based on plastics, such as polyester or acrylate panels, are, however, particularly sensitive to scratching and are not adequately resistant to organic solvents. For this reason they are also not very suitable for these applications.

European application No. 85,105,851.1, which does not constitute a prior publication, relates to a decorative panel which is particularly suitable for exterior uses, for interior construction and for the production of special furniture, and which has a surface which is not sensitive to hydrolysis and is adequately resistant to the effects of weathering, mineral acids and organic solvents, and which also has a high surface hardness. This is composed of a core layer and a decorative layer on one or both sides. At least the outermost layer of the panel on at least one of the two panel surfaces is composed predominantly of a synthetic resin formed from one or more components, polymerized by radiation and selected from the group comprising unsaturated acrylates and methacrylates. This layer has a particularly high surface hardness. It is still scratch-resistant at a scratch loading of at least 1.5N, preferably 2 to 7N (DIN 53,799, part 10). In the process for the production of this panel, a liquid surface layer comprising the components which can be polymerized by radiation is applied to a substrate and is subsequently polymerized by radiation. The panel surface does not have the desired properties until after a further stage in which the surface layer which has been polymerized by radiation is compressed together with the substrate at an elevated temperature.

However, this decorative panel has the property, which is frequently undesirable, of exhibiting a certain degree of gloss. If texturized separating media are used in the final compression under heat, it is admittedly possible to give the panel surface a surface structure which is texturized in conformity with the surface of the separating medium, for example a surface structure similar to orange peel, but its surface gloss is, as before, very high. The addition of known delustering agents, such as silicon dioxide pigments, to the outermost surface layer of the panel also does not, for practical purposes, reduce the gloss, since the pigment-containing surface, which is initially still satin-frosted after the radiation polymerization, unaccountably becomes glossy again as soon as the panel is subsequently subjected to compression under heat.

SUMMARY OF THE INVENTION

It is therefore an object of the invention to provide a decorative panel which is resistant to weathering, acids and solvents and which has a high surface hardness and only a slight surface gloss.

This object is achieved by a decorative panel which comprises a core layer; an outermost layer applied over the core layer, the outermost layer being a synthetic resin polymerized by radiation and comprising an unsaturated acrylate or an unsaturated methacrylate, and further being scratch resistant at a scratch loading of at least about 1.5 Newtons as defined by DIN 53,799 part 10 and having a reflectometer value no greter than about 50 at an angle of incidence of 85° as defined by DIN 67,530; and decoration means for forming a decoration covering the core layer.

The object of the invention is also achieved by a process for the production of a decorative panel which comprises applying a liquid synthetic resin layer to a substrate; applying a film having a surface roughness over the resin layer; transferring the surface roughness to the resin layer; polymerizing the resin layer by exposure to radiation; and compressing the resin layer and the substrate at an elevated temperature.

The object of the invention is further achieved by a process for the production of a decorative panel which comprises applying a first layer containing decoration means to a substrate; applying a second layer over the first layer, the second layer being a synthetic resin; applying a film having a surface roughness over the second layer; transferring the surface roughness to the second layer; polymerizing the resin layer by exposure to radiation; and compressing the first and second layers and the substrate at an elevated temperature.

BRIEF DESCRIPTION OF THE DRAWINGS

The invention is illustrated in greater detail by means of FIGS. 1 to 3*a* and the examples below.

DETAILED DESCRIPTION OF THE PREFERRED EMBODIMENTS

Figure 1:
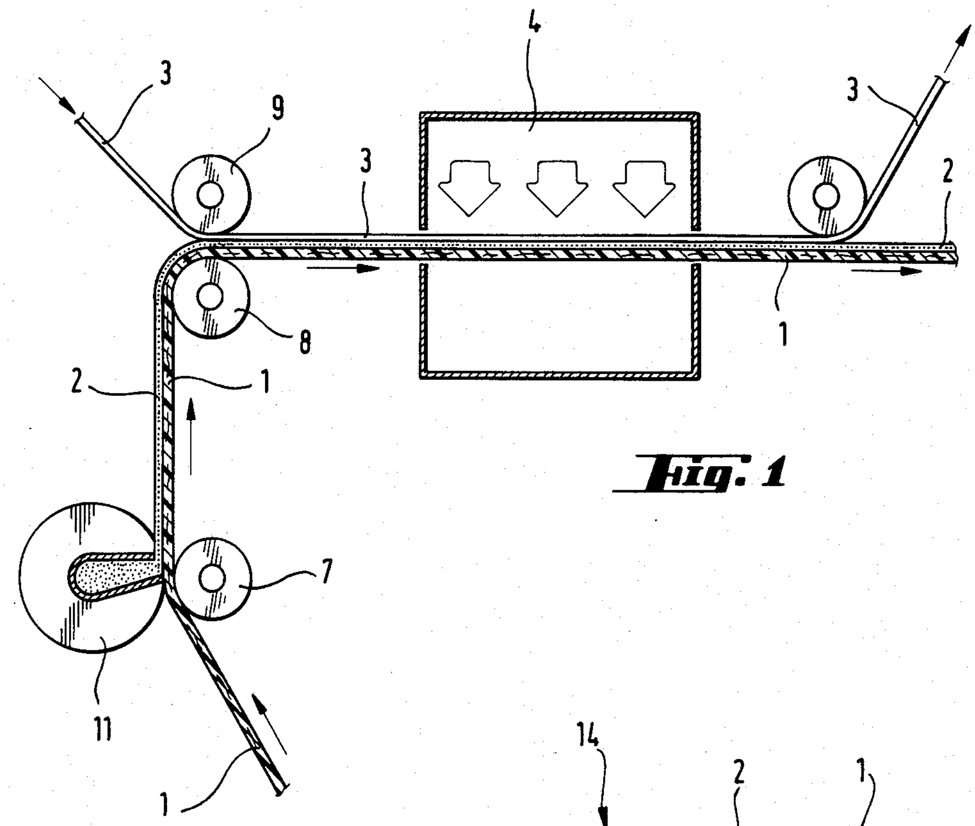
FIG. 1 shows the sequence of the process variant described in Example 1.

The panel of the invention is a sheet-like unit having a surface shape and surface structure suited to the intended use and which can, for example, also have a bent shape. Within the scope of the invention, a panel is also to be understood as sheeting.

In the measurement of scratch resistance carried out as specified in DIN 53,799, part 10, the force with which a diamond needle produces a visible scratch on the panel surface is determined. This assessment is made immediately after the action of the diamond needle, since, as a result of the elasticity of the surface layer, a slow recovery of the surface deformation can take place after the surface has been subjected to scratching. The scratch resistance is a measure of the surface hardness.

It has been found, surprisingly, that this decorative panel having the special layer of synthetic resin polymerized by radiation on at least one of its external surfaces not only has an excellent resistance to weathering, compared with the panels hitherto known, but, surprisingly, has an improved surface hardness. Additionally, it is appreciably less sensitive to acids and organic solvents.

The reflectometer value is determined using a type RB/Dr. Lange reflectometer as specified in DIN 67,530 as a measurable indication of the gloss of the panel surface. A reflectometer value determined as specified in this standard constitutes an optical characteristic value for the surface of a test specimen and bears a relation to the gloss of the surface. It must be borne in mind in this respect that the gloss is not a purely physical quantity, but is also a quantity conditioned by physiological and psychological considerations. Direct measurement of gloss is, therefore, not possible, but the "gloss power", that is to say the contribution made by the surface, by virtue of its reflectance properties, to the creation of the impression of gloss, can, in principle, be measured in a suitable manner. The reflectometer value can be used as a measure of the gloss power, since it is essentially determined by the reflectance properties of the surface.

The reflectometer system defined by this standard is modeled on the layout described in ASTM D 523-67. The 20°, 60° and 85° angles of incidence are chosen arbitrarily.

The 20° geometry of measurement is used for test specimens having a 60° reflectometer value of over 70, while the 85° geometry of measurement is used for test specimens having a 60° reflectometer value of less than 30.

In the reflectometer, a light source is formed into an image centrally in the aperture of a diaphragm. The light rays strike the panel surface at the prescribed angle of incidence (20°, 60° or 85°) and are reflected in a scattered manner. The light flux passing through the diaphragm is measured by means of a photoelectronic detector located behind the diaphragm.

The core layer has the substrate function of the panel. It is composed, for example, of wood. Panels or sheeting made of plastics, for example based on polyvinyl chloride, polyethylene or polystyrene, or made of metal, for example steel, aluminum, copper, brass or other alloys, are also suitable as the core layer. The layer of synthetic resin polymerized by radiation is located right on the surface of these core layers or is attached to the core layer by means of film glues or glued joints, or preferably by means of adhesion-promoting synthetic resins, such as, for example, a phenol-formaldehyde or resorcinolformaldehyde precondensate. Glued joints are merely layers of adhesive, while film glues are carrier layers which are coated or impregnated with adhesive. Adhesion promoters are substances which, without themselves being an adhesive, promote the attachment of two different materials.

The core layer can additionally be composed of the sheets of paper, especially sulfate kraft paper, which are customary in H.P.L. sheets and are impregnated with heat-curable synthetic resin, in particular phenol-formaldehyde resin, and which are compressed under hot conditions. Depending on the panel thickness desired, 1 to about 100 sheets on top of one another are compressed under hot conditions.

The core layer can also be composed of a nonwoven fabric or mats, consolidated under pressure and composed of mineral fibers, glass fibers, plastic fibers or a mixture of fibers, preferably cellulose. Cellulose-containing fiber layers are, for example, wood fibers or wood chips distributed in a random manner. The nonwoven fabric or the mat composed of wood and/or cellulose fibers is prepared by applying a synthetic resin to the fibers, drying the resin-coated fibers, shaping the product into a fiber mat and subjecting this mat to preliminary compression under the influence of pressure (European patent application No. 0,081,147).

If appropriate, there is an underlay containing a heat-curable aminoplast or phenoplast resin located on the external surface(s) of this fiber-containing core layer. This underlay is composed, for example, of a pigmented or non-pigmented nonwoven fabric or paper.

Immediately upon the fiber-containing core layer or on this underlay layer there follows, in a preferred embodiment, a layer of synthetic resin polymerized by radiation, which is decorative, i.e., exhibits a particular optical effect or a decorative effect as a result of added dyestuffs. On the decorative layer of synthetic resin polymerized by radiation there can also be a clear, i.e., transparent and dyestuff-free, layer of synthetic resin polymerized by radiation, which form(s) the outermost surface(s) of the panel; however, it is entirely possible to omit this clear layer of synthetic resin, so that the decorative layer(s) of synthetic resin then form(s) the outermost layer(s).

Instead of the decorative layer of synthetic resin, it is also possible to use a decorative layer based on a dyed and/or printed plastics film or based on paper; this is usually composed of pigmented, dyed and/or printed decorative paper. The layer, in this case transparent and free from dyestuffs, of synthetic resin polymerized by radiation is located on the plastics film or on the decorative paper. The decorative paper contains a heat-curable synthetic resin which is customary for this purpose, in particular an aminoplast resin, and is located on core layers which have been built up from the sulfate kraft paper typical for H.P.L panels or from wood or cellulose fibers distributed in a random manner and treated with phenolic resins.

The compounds envisaged for the preparation of the uppermost layer of synthetic resin, polymerized by radiation, embrace acrylic acid esters or methacrylic acid esters which can be polymerized by a free radical mechanism by actinic radiation and which are present, on their own or together, in a polymerizable mixture. The preferred component is a polyfunctional prepolymer, i.e., a polyunsaturated prepolymer. In addition to this predominant component, the copolymerizable mixture contains, if appropriate, a further component having a diluting action, which is described as a diluent monomer or diluent oligomer. The proportion in the mixture of the polyfunctional prepolymer is 50 to 100%, in particular 60 to 90%, by weight of the total weight of copolymerizable components. Prepolymers of a low viscosity (less than 100 poise at 20° C.) are employed without the monomers or oligomers producing dilution.

The components used have a strong tendency to polymerize by a free radical mechanism under the action of actinic radiation. Suitable actinic radiation is a light in the near UV region or high-energy radiation, for example electron, particle or x-ray radiation. The prepolymer which can be polymerized by free radical mechanism is a polyfunctional, unsaturated aliphatic or aromatic acrylate or methacrylate, preferably an unsaturated polyester acrylate oligomer and especially an aliphatic urethane acrylate oligomer. Although aromatic urethane acrylate oligomers also produce scratch-resistant surface coatings, these yellow after some time in exterior applications.

In addition to the prepolymer, a mono-, di-, tri-, tetra-, penta- or hexaacrylate or -methacrylate, preferably a diacrylate or triacrylate, is used as an additional suitable monomer or oligomer in the mixture which can be copolymerized by a free radical mechanism. These mono- to hexaacrylates or mono- to hexamethacrylates are esters of polyols having 1 to 6 OH groups with acrylic acid or methacrylic acid, respectively, and are therefore also known as polyol acrylates or polyol methacrylates, respectively. Suitable diacrylates are esters of acrylic acid with aliphatic, dihydric alcohols, in particular ethylene glycol, 1,2-propylene glycol, 1,3-propyleneglycol, butane diols, 1,6-hexane diol or neopentylglycol, with aliphatic ether-alcohols, in particular diethylene glycol, dipropylene glycol, dibutylene glycol, polyethylene glycols or polypropylene glycols, with oxyalkylated compounds of the above-mentioned aliphatic alcohols and ether-alcohols or with aromatic dihydroxy compounds, in particular bisphenol A, pyrocatechol, resorcinol, hydroquinone, p-xylyleneglycol or p-hydroxybenzyl alcohol. Preferred diacrylates are 1,6-hexanediol diacrylate, tripropylene glycol diacrylate and 1,4-butanediol diacrylate. Preferred triacrylates are trimethylolpropane triacrylate and pentaerythritol triacrylate.

In addition to the urethane acrylate oligomers and unsaturated polyester acrylate oligomers already mentioned, suitable polyfunctional prepolymers are also epoxy-acrylate and silicone-acrylate oligomers, which are preferably used together with the diacrylates or triacrylates mentioned in the mixture which can be copolymerized by a free radical mechanism.

The prepolymers are compounds known per se and are prepared, for example, from hydroxylated copolymers in which the hydroxyl groups are distributed statistically along the copolymer chain. Statistically unsaturated acrylic copolymers are obtained from this copolymer by esterifying the hydroxyl groups with acrylic acid. Semi-terminal unsaturated acrylic copolymers are prepared by having the hydroxyl group at the end of the chain in the preparation of the hydroxylated copolymers. Urethane acrylate oligomers are prepared by reacting (meth)acrylic acid esters containing hydroxyl groups, for example, hydroxyethyl methacrylate, with polyfunctional isocyanates, preferably diisocyanates. The diisocyanates or polyisocyanates can preferably be reaction products of diols, polyether-diols or polyester-diols containing a stoichiometric excess of monomeric diisocyanate or polyisocyanate.

If the polyfunctional prepolymer preponderates in the polymerizable mixture, as the base resin, by virtue of its chemical nature, it determines the properties of the cured surface layer. The monoacrylate to hexaacrylate or monomethacrylate to hexamethacrylate added makes it possible as a diluent monomer or oligomer, to adjust the viscosity of the mixture to be cured, which is normally within a viscosity range from 20 to 100 poise (20° C.), and entirely takes part in the free radical polymerization. When irradiated, the coating is cured through free radical polymerization between the double bonds of the prepolymer and of the diluent monomer or oligomer which may be present.

If curing is carried out under the influence of UV-light, it is necessary to add photoinitiators which facilitate, by the formation of radicals, the initiation of the free radical polymerization. If curing is carried out with electron beams, no photoinitiators are required, however. Most of the photoinitiators contain at least one carbonyl group conjugated with an aromatic ring. A photoinitiator system composed of several components is usually employed.

In addition, the synthetic resin which is polymerized by radiation contains, if appropriate, suitable additives such as plasticizers, fillers, dyestuff pigments, agents for improving abrasion resistance and stabilizers, in order to achieve the desired decorative, mechanical and physical surface properties. These substances include, for example, barium sulfate, silica, aluminum oxide and light-stable pigments.

The decorative panel is produced by applying the liquid compounds which can be polymerized by radiation to the substrate to be coated, for example, by spraying, casting, a doctor system, a roller or screen printing. If it has been applied to a decorative layer, the layer applied is then transparent. It can, however, also be decorative itself and it is then colored and is located on a non-decorative paper layer or right on the core layer. In a further embodiment, an additional layer which can be polymerized by radiation but which, however, is not decorative but transparent, is also applied to this decorative layer of synthetic resin after the curing by radiation.

The substrate used for the application of the compounds which can be polymerized by radiation is thus a paper layer, a decorative paper layer or the above-mentioned core layers based on wood, plastics, metal or a stack of further fiber-containing layers which forms the core of the panel subsequently obtained. The fiber-containing layers of the stack, which are preferably composed of sulfate kraft paper or of a nonwoven fabric made of wood and/or cellulose fibers, contain the heat-curable, precured resins customary for H.P.L. panels, in particular phenol-formaldehyde resins, whereas the paper sheets which may optionally additionally be present on the stack contain an aminoplast resin or, especially, a phenoplast resin. The content of heat-curable resins is 20 to 250% by weight, relative to the particular layer.

The immersion or impregnation of the fiber-containing layers or the paper layers is carried out, for example, by immersion in a bath of a solution or dispersion containing the heat-curable resin or by application or spraying by means of a metering system. The solvent or dispersing agent is aqueous alcohol, aqueous acetone or water, depending on the synthetic resin used. It can also contain up to 20% by weight of fire-retardant agents. The desired amount of resin is then distributed by scraping off or squeezing out, for example, by means of rollers.

The heat-curable resins of the substrate are precured and dried in a customary manner before the application to the intended substrate of the compounds which can be polymerized by radiation.

During the radiation polymerization, the outermost, still liquid, layer composed of compounds which can be polymerized by radiation is covered by a sheet or panel of plastics or paper or a composite film made from several layers of plastics or layers of plastics and paper, which has a rough surface structure and which must be sufficiently transparent for the actinic radiation. The film or panel intended for covering must not have a very porous surface, since otherwise there is a risk that the liquid compounds still capable of polymerization by radiation will penetrate into the surface. In this event it is no longer possible to remove the film or panel after polymerization. This outermost liquid layer can itself be decorative and can contain a dyestuff or can be non-decorative, i.e., transparent, and can then be located on a decorative layer or on a decorative layer of synthetic resin which will be polymerized by radiation. It is preferable to employ films having a thickness of up to 0.1 mm, since thicker coverings are not adequately transparent for electron beams or UV radiation, or require relatively long exposure times. In general, films of a thickness from 20 to 60 μm are used, since, on the one hand, they are adequately transparent for the radiation and, on the other hand, they also have an adequate mechanical strength. For the sake of simplicity, they will be described as films or covering films in the following text.

The plastics film is composed, in particular, of a polyester or polypropylene film which has been oriented by biaxial stretching. The rough structure of the film intended for covering is produced, for example, by the addition of pigments, at least in the neighborhood of its outer surface. This surface roughness depends on elevations in the surface of the film, the height of which is, however, only slight in comparison with the thickness of the film and is within the range of a few micrometers at the most. The pigments are composed, for example, of inorganic particles, in particular of aluminum oxide, aluminum sulfate, barium sulfate, calcium carbonate, magnesium carbonate, kaolin, talc, silicon dioxide, titanium dioxide or glass microbeads, or organic plastics particles which are incompatible with the plastic of the film and which are dispersed as particles in the film. The pigments usually have a particle size from 0.1 to 20 μm, the average particle size being within the range from 0.1 to 4 μm. Their concentration is 0.01 to 10% by weight, relative to the weight of the film. The concentration of the pigments in the film and their size is adjusted to suit the desired surface roughness of the plastics film.

The application of the covering film to the liquid layer still capable of polymerization by radiation is effected by first applying this liquid layer to the substrate in the manner described above and then providing it with the covering film, the rough side of the surface of the covering film coming into contact with the liquid, polymerizable layer. It is also possible, however, first to apply the liquid, polymerizable layer to the rough side of the surface of the covering film and then to apply the covering film together with this liquid layer to the substrate.

The roughness of the surface is transferred to the surface of the layer to be polymerized by radiation, which then assumes the surface structure of the covering film and obtains a mat appearance. This result is all the more surprising because the surface gloss of the end produce can, for practical purposes, no longer be reduced by using texturized separating media in the final compression process.

The polymerization caused by radiation can be initiated by employing a customary source for the formation of free radicals, such as, for example, a photoinitiator, or heat alone is supplied. If the photopolymerizable layer contains photoinitiators, the polymerization is initiated by passage under mercury vapor lamps. The absence of oxygen is not necessary for curing by means of UV radiation. It is appropriate for the electron beams used for curing the polymerizable compounds to have an energy corresponding to 150 to 350 KeV. The energy of the electron accelerator is determined by the thickness of the synthetic resin layer to be formed, the dose of radiation required and the time of treatment or the speed with which it is carried out.

The devices used for accelerating the electron beams are commercially available. These are the accelerators known as the "scanner type" and the "linear cathode type". Free radicals are formed by interaction with the components of the polymerizable layer. This curing process is usually carried out at room temperature. For curing by means of electron beams too, it is not necessary for this process to be carried out in an inert atmosphere, i.e., a substantially oxygen-free atmosphere, since the polymerizable surface layer is protected by the plastic film resting on it.

The covering film can be removed after the polymerization effected by radiation. It is also possible, however, not to remove the covering film until the completion of the process, i.e., after the compression under heat, or to use it as a casing for the finished panel. If the substrates are sufficiently flexible, they are rolled up for storage or are immediately cut to the desired size. If the substrate containing the resin polymerized by radiation is only composed of a paper layer, it is laid on a stack of fiber-containing layers forming the core layer. It is also possible additionally to provide the lower face of the stack with a substrate of this type.

The resulting bundle of layers composed of a fiber-containing core layer and surface layer(s) polymerized by radiation and, if appropriate, intermediately placed layers of paper or decorative paper is compressed under hot conditions, as is customary in the production of H.P.L. panels, to give a decorative panel, in the course of which the heat-curable resins are cured. The temperature is preferably 120° to 210° C., the pressure is within the range from 10 to 100 bar and the treatment time is 1 to 30 minutes. If, however, the core layer is composed of a wooden, plastic or metal panel, the temperature and the pressure can usually be reduced to values of 80° C. and 5 bar.

Compression is carried out in a daylight, short cycle or continuous press. The number and thickness of fiber-containing layers in the core layer or the thickness of the core layer is selected depending on the use of the panel, panel thicknesses of 3 to 25 mm being required for exterior applications, depending on the intended use. If a large number of panels containing layers of synthetic resin polymerized by radiation are stacked one on top of the other in the press, which is of economic advantage if the core layer has a low thickness, the individual panels are separated from one another in each case by means of a separating medium. The separating medium is, for example, a paper layer, a plastics film or a metal plate. If the separating medium has a coarse surface structure, i.e., elevations or indentations, this coarse structure is imparted to the adjacent external layer of the particular panel, the mat fine structure already present being retained. The degree of gloss on the panel surface, already established by the radiation process, cannot, for practical purposes, be modified further by means of the separating medium.

The decorative panels produced are, surprisingly, particularly resistant to weathering and extremely scratch-resistant, which could possibly be due to an unforeseeable interaction between the various resins or perhaps also to subsequent crosslinking of the compounds polymerizable by free radicals when compressed under heat. The scratch resistance and the resistance to chemicals are, surprisingly, substantially higher than in the case of a panel which receives a coating of the same compounds which can be polymerized by radiation, this coating—without the compression under heat—only having been polymerized by a free radical mechanism by means of radiation. In addition, the surface of the panel has a considerably reduced gloss, such as cannot be achieved even if delustering agents are used in the surface layer.

Figure 1A:
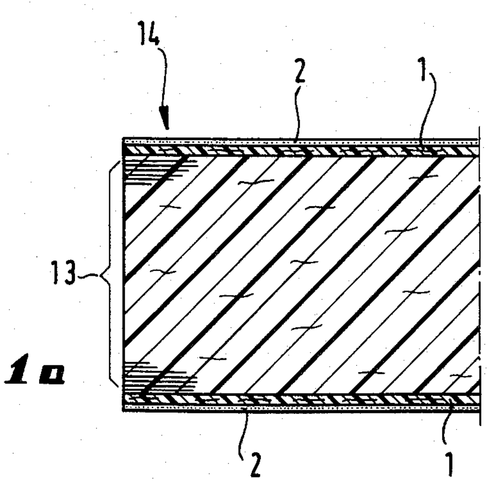
FIG. 1*a* shows a partial cross-section through a panel according to FIG. 1.
Figure 2:
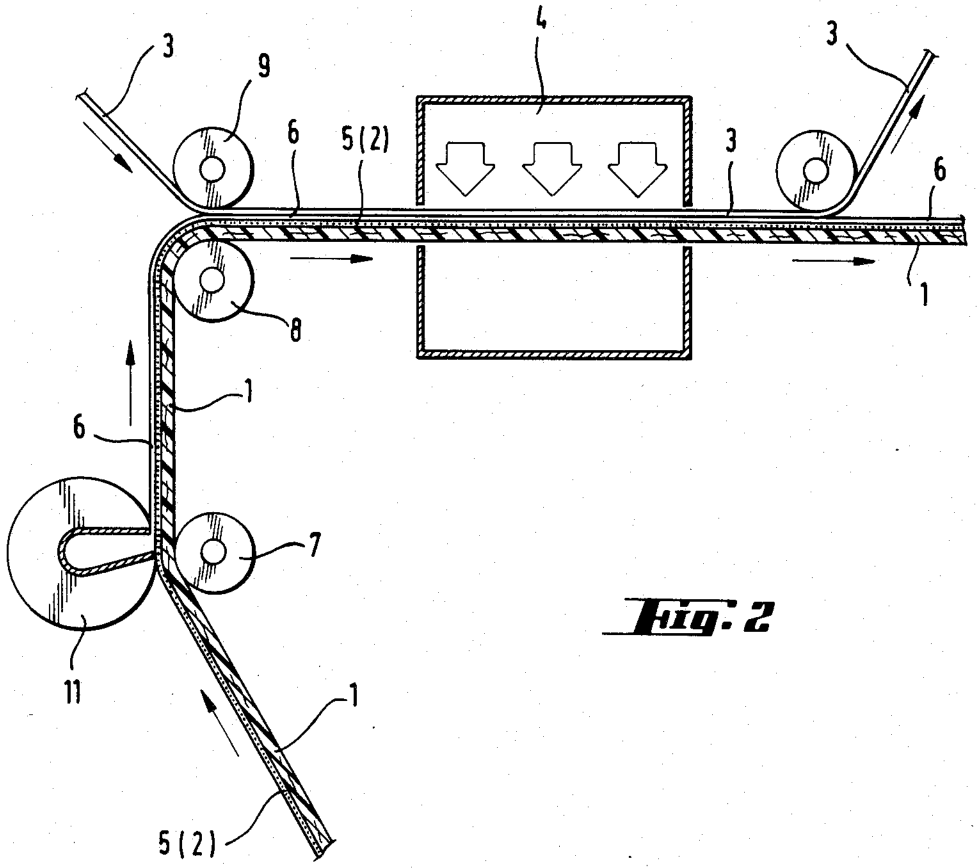
FIG. 2 shows the sequence of the process variant described in Example 2.
Figures 3, 3A:
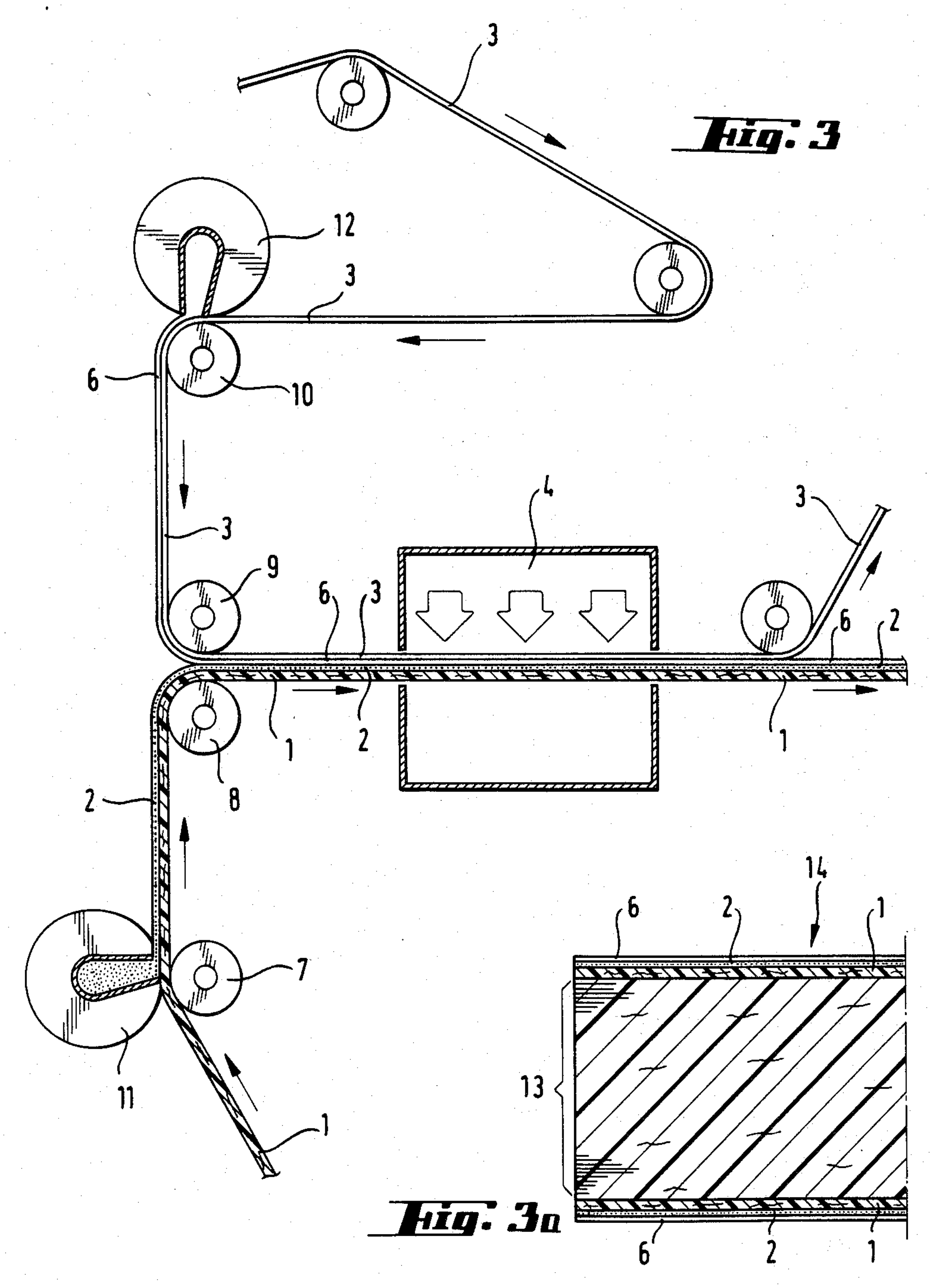
FIG. 3 shows the sequence of the process variant described in Example 3.
FIG. 3*a* shows a partial cross-section through a panel according to FIGS. 2 and 3.

Components having identical functions are marked with identical numbers in the figures. In FIG. 1, the sulfate kraft paper 1 containing partly cured synthetic resin is provided with a liquid layer 2 which contains dyestuff and can be polymerized by radiation. The layer 2 is covered by the plastics film 3 and is cured by means of electron beams in the apparatus 4. In FIG. 2, the dyestuff-containing layer 5 is already partly cured by radiation when it is provided with the transparent liquid layer 6 which can be polymerized by radiation. The plastics film 3 is applied to the layer 6. FIG. 3 differs from FIG. 1 only in that there is also a transparent liquid layer 6 which can be polymerized by radiation located on the plastics film 3. In the figures, the guide rollers are marked 7, 8, 9 and 10 and the coating devices are marked 11 and 12. Compressed panels 14 according to the layer arrangements of FIGS. 1, 2 and 3 can be seen in FIGS. 1*a* and 3*a*. The stack forming the core is marked 13.

In the following examples, the percentages are percent by weight.

EXAMPLE 1

As shown in FIG. 1, a pasty liquid 2 (viscosity 50 poise at 25° C.) composed of a mixture, polymerizable by radiation, of 85 parts by weight of an aliphatic urethane acrylate oligomer as prepolymer, 15 parts by weight of hexane diol diacrylate as diluent monomer and 10 parts by weight of organic dyestuff pigments is applied to a sulfate kraft paper 1 which has first been impregnated with a heat-curable phenol-formaldehyde resin (amount of resin applied 70%), after the resin has been partly cured by means of rollers, whereupon a continuous film (layer thickness about 80 μm) is formed. Immediately afterwards, a delustered, biaxially stretched polypropylene single-ply film 3 containing 8% by weight of calcium carbonate of average particle size 3 μm is applied to this film composed of compounds polymerizable by radiation, and the film is crosslinked in a substantially homogeneous manner by means of electron beams at room temperature without the application of pressure. The dose of radiation absorbed is 60 KGy.

After the plastics film 3 has been removed, the paper 1 with the external layer 2 of synthetic resin copolymerized by radiation is placed in each case on the external face of a stack 13 composed of 50 superposed sheets of paper. The sheets of paper have previously been impregnated with a heat-curable phenol-formaldehyde resin, and the resin has been partly cured. The bundle of layers is compressed at 150° C. and 80 bar for 10 minutes in a press between two texturized metal sheets. A bundle has the following composition:

A first decorative layer 2 (synthetic resin containing organic dyestuff pigments and polymerized by radiation) as the outer layer on a first previously impregnated paper layer 1, 50 paper webs (impregnated with a phenol-formaldehyde resin) as the core layer 13, and a second decorative layer 2 (synthetic resin containing organic dyestuff pigments and polymerized by radiation) as the outer layer on a previously impregnated second paper layer 1.

The resulting panel 14, which is 10 mm thick and is decorated on both sides, has a scratch resistance higher than 3.0N (DIN 53,799, part 10). It is insensitive to hydrolysis and shows no changes after being boiled in water for 100 hours. Its surface is not attacked by concentrated mineral acid during an exposure time of 6 hours (DIN 53,230). The fastness to light of this panel is given rating 8 (DIN 54,004). The resistance of the panel to the effects of weathering is determined as specified in ASTM G 53-84, in which a time cycle of 4 hours UV/4 h CON (condensation period) is maintained for 1500 hours at a test temperature of 50° C. The decorative surfaces exhibit a low surface gloss corresponding to a reflectometer value of 20–22, 60° angle of incidence or to a reflector value 44–45, 85° angle of incidence (DIN 67,530). After weathering, the panel exhibits no discoloration or change in gloss.

EXAMPLE 2

The viscous, radiation-polymerizable, dyestuff-containing liquid 2 of Example 1 is applied, as described in Example 1, to a sulfate kraft paper 1 containing precured phenolformaldehyde, resin, and is crosslinked in an essentially homogeneous manner by means of electron beams. The dose absorbed is 5 to 10 KGy. A further layer 6 composed of transparent—i.e., dyestuff-free—radiation-polymerizable liquid which, apart from the dyestuff, contains the same compounds as the layer first applied is applied as shown in FIG. 2, by means of rollers or rotary screen printing, to the surface of the paper on which the decorative layer 5 of synthetic resin polymerized by radiation is located. This layer 6 forms a continuous film having a layer thickness of about 20 μm. Immediately after the application of this second layer, a biaxially oriented polyethylene terphthalate single-ply film 3 which has been delustered by stretching is placed on the wet layer 6. Curing is carried out analogously to Example 1 by means of electron beams. The dose of radiation absorbed is 60 KGy. After the plastics film 3 has been removed, the paper 1 containing the external layer 6 of synthetic resin copolymerized by radiation is laid in each case on the outer face of a stack 13 composed of 50 superposed sheets of paper. The sheets of paper have previously been impregnated with a heat-curable phenol-formaldehyde resin and the resin has been partly cured. The bundle of layers is compressed at 150° C. and 80 bar for 10 minutes in a press between two sheets of metal. It has the following composition:

Transparent layer 6 (synthetic resin polymerized by radiation) as the outermost layer, Decorative layer 5 (synthetic resin containing organic dyestuff pigments and polymerized by radiation), both layers on a previously impregnated paper layer 1, 50 paper webs (impregnated with a phenol-formaldehyde resin) as the core layer 13, Decorative layer 5 (synthetic resin containing organic dyestuff pigments and polymerized by radiation), and Transparent layer 6 (synthetic resin polymerized by radiation) as the outermost layer, both layers on a previously impregnated paper layer 1.

The resulting decorative panel 14 has a scratch resistance higher than 2.0N (DIN 53,799, part 10). Its surface is not attacked by concentrated mineral acid during a treatment time of 6 hours. The fastness to light of this panel is given the rating 8 (DIN 54,004). It has a surface gloss corresponding to a reflectometer value of 22–24, 60° angle of incidence, and a reflectometer value of 44–45, 85° angle of incidence (DIN 67,530).

EXAMPLE 3

The pasty, dyestuff-containing liquid 2, composed of radiation-polymerizable compounds, of Example 1 is applied to a sulfate kraft paper 1 which has first been impregnated with a heat-curable phenol-formaldehyde resin (amount of resin applied 70%) of which the resin has been partially cured, and a continuous film (layer thickness about 80 μm) is formed (cf. FIG. 3).

A transparent layer 6 composed of a pasty, dyestuff-free liquid composed of the same radiation-polymerizable compounds is applied (layer thickness about 20 to 40 μm) to a delustered polypropylene plastics film 3. The paper 1 and the plastics film 3 are then placed one on top of the other in sheet or web form, so that the two liquid layers 2 and 6 come into contact with one another. In so doing, care must be taken that inclusions of air are not formed. The polymerizable compounds are crosslinked by means of electron beams which impinge on the liquid layers 2 and 6 through the plastics film 3. The dose absorbed is 60 kGy. After the plastics film 3 has been removed, the paper 1 containing the polymerized surface layer 2 and 6 is processed further to give a decorative panel 14 by compression under heat together with a paper stack 13, as described in Example 2.

The layers of synthetic resin polymerized by radiation in the examples still exhibit relatively low values of scratch resistance within the range from about 0.7 to 0.9 Newtons before the compression under heat. A substantially higher surface hardness in the panel is only obtained, surprisingly, after the layer of synthetic resin polymerized by radiation has been subjected, in accordance with the invention, to compression under heat.

The reflectometer value measured with a Dr. Lange type RB reflectometer as specified in DIN 67,530 is 45 to 47, 20° angle of incidence, and about 83, 60° angle of incidence, if the delustered plastics film is absent when curing with electron beams is carried out. It falls to values of 37 to 41, 20° angle of incidence, and about 79, 60° angle of incidence, if texturized compression elements which impart to the outermost layer of the panel, for example, a surface structure similar to that of orange peel are used in the compression under heat. Even lower reflectometer values of about 30 to 36, 20° angle of incidence, and about 75, 60° angle of incidence, can be achieved by adding delustering agents to the surface layer. The particularly low gloss values according to the invention can, however, only be achieved by means of the special measures used in the polymerization of the synthetic resin layer.

What is claimed is:

1. A decorative panel, comprising:

a core layer;

an outermost layer applied over said core layer, wherein said outermost layer comprises a synthetic resin polymer, which polymer is comprised of at least one unsaturated acrylate or unsaturated methacrylate group; and wherein said outermost layer is scratch resistant at a scratch loading of at least about 1.5 Newtons as defined by DIN 53,799 part 10 and has a reflectometer value no greater than about 50 at an angle of incidence of 85° as defined by DIN 67,530; and decoration means for forming a decoration covering said core layer.

2. A decorative panel according to claim 1, wherein said outermost layer is scratch resistant at a scratch loading of from about 2 to about 7 Newtons.

3. A decorative panel according to claim 1, wherein said synthetic resin polymer comprises at least one oligomer selected from the group consisting of an epoxy-acrylate, an epoxy-methacrylate, a silicone-acrylate, a silicone-methacrylate, a polyester acrylate, a polyester methacrylate, a urethane acrylate, and a urethane methacrylate.

4. A decorative panel according to claim 3, wherein said outermost layer further comprises at least one diluent selected from the group consisting of a monoacrylate, diacrylate, triacrylate, tetraacrylate, pentaacrylate, hexaacrylate, monomethacrylate, dimethacrylate, trimethacrylate, tetramethacrylate, pentamethacrylate, and hexamethacrylate; and wherein said monomer or oligomer is copolymerized with said synthetic resin.

5. A decorative panel according to claim 4, wherein said diluent comprises an ester of (i) a polyol or an ether polyol and (ii) an acrylic or methacrylic acid.

6. A decorative panel according to claim 3, wherein said synthetic resin polymer comprises at least one oligomer selected from the group consisting of an epoxy-acrylate, a silicone-acrylate and a polyester-acrylate.

7. A decorative panel according to claim 1, wherein said aliphatic urethane acrylate oligomer is copolymerized with a diacrylate or triacrylate by radiation.

8. A decorative panel according to claim 2, wherein said underlay comprises a pigmented or non-pigmented nonwoven fabric or paper and a heat curable aminoplast or phenoplast resin.

9. A decorative panel according to claim 1, wherein said decoration means is incorporated in said outermost layer.

10. A decorative panel according to claim 1, wherein said core layer comprises at least one material selected from the group consisting of (a) wood, (b) a plurality of sheets of paper, plastic, or metal (c) nonwoven fabric, and (d) fiber mats.

11. A decorative panel according to claim 1, wherein said decorative panel further comprises at least one additional layer between said core layer and said outermost layer; and wherein said decoration means is incorporated in said additional layer.

12. A decorative panel according to claim 1, wherein said decoration means comprises a decorative layer comprising at least one selected from the group consisting of (a) a dyed plastic film, (b) a printed plastic film, (c) a dyed paper, and (d) a printed paper.

13. A decorative panel according to claim 1, wherein a separate outermost layer is applied on opposite sides of said core layer.

14. A decorative panel according to claim 3, wherein said synthetic resin polymer comprises an urethane acrylate oligomer that is an aliphatic urethane acrylate oligomer.

15. A decorative panel according to claim 1, wherein said decorative panel further comprises an underlay between said core and said outermost layer.

16. A decorative panel according to claim 11, wherein said outermost layer is clear.

17. A decorative panel according to claim 15, wherein said panel further comprises at least one additional layer between said underlay and said outermost layer; and wherein said decoration means is incorporated in said additional layer.

18. A decorative panel according to claim 6, wherein said synthetic resin polymer is copolymerized with a diacrylate or a triacrylate.

* * * * *